United States Patent
Lach

(10) Patent No.: US 11,229,957 B2
(45) Date of Patent: Jan. 25, 2022

(54) METHOD FOR PRODUCING A CUTTING TOOL FOR THE MACHINING OF WORKPIECES AND CUTTING TOOL

(71) Applicant: JACOB LACH GMBH & CO. KG, Hanau (DE)

(72) Inventor: Horst Lach, Hanau (DE)

(73) Assignee: JAKOB LACH GMBH & CO. KG, Hanau (DE)

(*) Notice: Subject to any disclaimer, the term of this patent is extended or adjusted under 35 U.S.C. 154(b) by 265 days.

(21) Appl. No.: 16/149,516

(22) Filed: Oct. 2, 2018

(65) Prior Publication Data
US 2020/0101539 A1    Apr. 2, 2020

(51) Int. Cl.
*B23B 27/14*    (2006.01)
*B23B 27/22*    (2006.01)
*B23K 1/008*   (2006.01)

(52) U.S. Cl.
CPC .......... *B23B 27/148* (2013.01); *B23B 27/143* (2013.01); *B23B 2222/28* (2013.01); *B23B 2226/125* (2013.01); *B23B 2226/315* (2013.01); *B23K 1/008* (2013.01)

(58) Field of Classification Search
CPC .......... B23B 2222/28; B23B 2226/125; B23B 2226/315; B23B 27/143; B23B 27/148; B23B 51/02; B23K 31/025; B23P 15/28–52; B21K 5/00–16
USPC .................................................. 76/101.1
See application file for complete search history.

(56) References Cited

U.S. PATENT DOCUMENTS

| | | | | |
|---|---|---|---|---|
| 4,449,864 A | * | 5/1984 | Haque | B23C 5/202 407/113 |
| 4,539,875 A | * | 9/1985 | Lee | B23B 27/1629 407/113 |
| 4,588,332 A | * | 5/1986 | Komanduri | B23B 27/141 407/114 |

(Continued)

FOREIGN PATENT DOCUMENTS

| | | | | |
|---|---|---|---|---|
| DE | 19919123 A1 | * | 11/2000 | B23B 27/141 |
| DE | 10216408 A1 | * | 10/2003 | B23B 27/146 |

(Continued)

*Primary Examiner* — Sara Addisu
(74) *Attorney, Agent, or Firm* — Ladas & Parry LLP; Malcolm J. MacDonald

(57) ABSTRACT

The invention relates to a drilling tool (50), in particular a dowel hole drill, for the machining of workpieces, in particular workpieces made of wood, plastics, composite materials, comprising a drill shaft (56) with a front surface (60), and to a drill head (58) with at least one cutting edge (66), which is firmly connected, such as soldered, to the drill shaft (56). In order to make available a drilling tool of the type mentioned at the start, which has a broad range of application and is simple to produce, it is provided that the drill head (58) is formed from a composite material with exclusively two layers (38), namely a hard metal layer (36) and an ultra-hard layer (38) which is connected to the hard metal layer (36) and preferably formed from polycrystalline diamond or polycrystalline boron nitride, that the ultra-hard layer (38) is connected directly to the front surface (60) of the drill shaft (56) and that the at least one cutting edge (66) is formed by the ultra-hard layer (38), and a drill bit (62) such as a centering tip is formed by the hard metal layer (36).

8 Claims, 4 Drawing Sheets

DETAIL C

(56) References Cited

U.S. PATENT DOCUMENTS

| | | | | |
|---|---|---|---|---|
| 4,627,317 A * | 12/1986 | Komanduri | | B23B 27/145 407/113 |
| 4,714,385 A * | 12/1987 | Komanduri | | B22F 7/06 407/119 |
| 4,884,476 A * | 12/1989 | Okuzumi | | B23B 27/145 76/101.1 |
| 4,906,528 A * | 3/1990 | Cerceau | | B22F 7/06 419/12 |
| 5,044,839 A * | 9/1991 | Takahashi | | B23B 27/143 407/114 |
| 5,078,551 A * | 1/1992 | Oomen | | B23B 27/20 125/36 |
| 5,135,061 A | 8/1992 | Newton, Jr. | | |
| 5,173,089 A * | 12/1992 | Tanabe | | B23B 27/145 51/293 |
| 5,193,948 A * | 3/1993 | Noggle | | B23B 27/141 407/116 |
| 5,405,711 A * | 4/1995 | Noggle | | B23B 27/143 407/114 |
| 5,569,000 A * | 10/1996 | Littecke | | B22F 7/06 407/114 |
| 5,584,616 A * | 12/1996 | Katbi | | B23B 27/143 407/114 |
| 5,755,536 A * | 5/1998 | Vollmer | | B23B 27/145 407/113 |
| 6,155,755 A * | 12/2000 | Kanada | | B23B 27/18 407/118 |
| 6,315,502 B1 * | 11/2001 | Maurer | | B23B 27/141 407/118 |
| 6,540,450 B2 | 4/2003 | Gatton | | B23B 5/02 407/113 |
| 6,655,881 B2 * | 12/2003 | Shimizu | | B23B 27/145 407/113 |
| 8,616,810 B2 * | 12/2013 | Kaufmann | | B23B 27/143 407/116 |
| 9,199,312 B2 | 12/2015 | Chen et al. | | |
| 10,086,436 B2 * | 10/2018 | Sasaki | | B23B 27/141 |
| 10,406,609 B2 * | 9/2019 | Ballas | | B23C 5/06 |
| 10,814,401 B2 * | 10/2020 | Fukuyama | | B23B 27/22 |
| 2002/0071187 A1 * | 6/2002 | Kono | | B23B 27/20 359/742 |
| 2003/0063955 A1 | 4/2003 | De Beaupre et al. | | |
| 2004/0234349 A1 * | 11/2004 | Ueda | | C23C 30/005 407/113 |
| 2004/0256442 A1 * | 12/2004 | Gates, Jr. | | C23C 30/005 228/141.1 |
| 2007/0116531 A1 * | 5/2007 | Okita | | B23B 27/143 407/114 |
| 2008/0025802 A1 * | 1/2008 | Kukino | | B23B 27/145 407/42 |
| 2008/0226405 A1 * | 9/2008 | Sjogren | | B23B 27/145 407/114 |
| 2008/0286558 A1 * | 11/2008 | Kukino | | C04B 41/4529 428/323 |
| 2009/0148249 A1 * | 6/2009 | Pretorius | | B27G 13/00 408/144 |
| 2010/0003091 A1 * | 1/2010 | Muraki | | B23P 15/28 407/119 |
| 2010/0272527 A1 * | 10/2010 | Webb | | B23K 31/025 407/118 |
| 2016/0001381 A1 * | 1/2016 | Lach | | B23D 77/006 407/11 |
| 2017/0320142 A1 * | 11/2017 | Lach | | B33Y 70/00 |
| 2017/0320144 A1 * | 11/2017 | Nishibayashi | | C23C 14/352 |
| 2020/0009664 A1 * | 1/2020 | Ikeda | | B23B 27/20 |

FOREIGN PATENT DOCUMENTS

| | | | | |
|---|---|---|---|---|
| EP | 1 023 961 A1 | 8/2000 | | |
| EP | 1023961 A1 * | 8/2000 | | B23B 27/141 |
| EP | 2 067 552 A1 | 6/2009 | | |
| EP | 2067552 A1 * | 6/2009 | | B23B 27/141 |
| JP | 62024903 A * | 2/1987 | | B23B 27/145 |
| JP | 06297206 A * | 10/1994 | | C04B 41/009 |
| JP | 10193203 A * | 7/1998 | | |
| JP | 2017121674 A * | 7/2017 | | B24B 41/066 |
| WO | 0044518 A1 | 8/2000 | | |
| WO | 2010034410 A1 | 4/2010 | | |
| WO | WO-2013142885 A1 * | 10/2013 | | B23B 27/141 |
| WO | WO-2016136694 A1 * | 9/2016 | | B23B 27/22 |

\* cited by examiner

DETAIL C

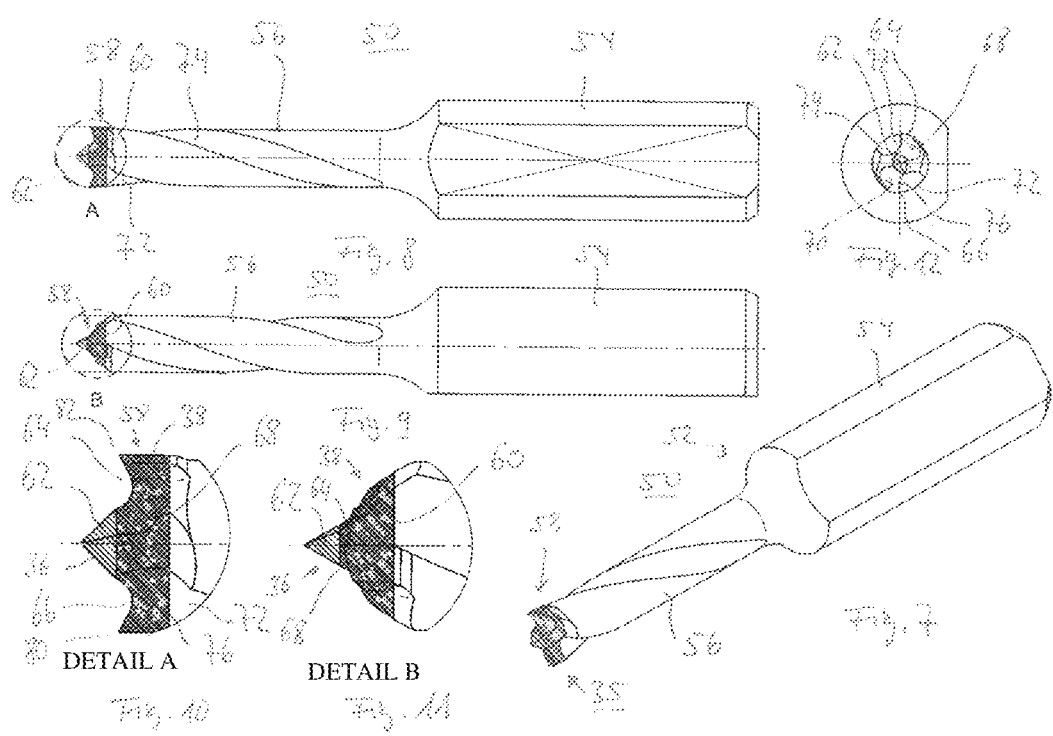

METHOD FOR PRODUCING A CUTTING TOOL FOR THE MACHINING OF WORKPIECES AND CUTTING TOOL

The invention relates to a method for producing a cutting tool for the machining of workpieces, in particular workpieces made of nonferrous metals, plastics, composite materials, hardened steels or cast materials.

The invention moreover relates to a cutting tool for the machining of workpieces, in particular workpieces made of nonferrous metals, plastics, composite materials, hardened steels or cast materials.

A method and a cutting tool of the type mentioned at the start are known from DE 10 2012 002 547 A1. The cutting tool comprises a cutting insert with a preformed discrete cutting edge which encloses a curved cutting corner of the insert. The cutting edge comprises an upper layer and a lower layer which is made of a relatively harder material than the upper layer. In an embodiment, the lower layer is produced from polycrystalline diamond (PCD) or from a polycrystalline cubic boron nitride material (CBN), while the upper layer is produced from hard metal. The cutting insert can moreover comprise a chip control structure which is formed in the cutting edge and which comprises several facets formed on the two sides of a center line, in order to enable chip control during a cutting process. The chip control structure can be formed in a two-step process in order to expose a portion of the lower layer. The discrete cutting edge can be soldered to the cutting insert, before the chip control structure is formed.

WO 2010/034410 A1 relates to a tool for the machining of workpieces with at least one geometrically defined cutting edge and with a central axis. The tool comprises at least three areas along its axial extension, wherein at least three adjacent areas comprise alternatingly a ductile material and a hard material.

The three areas are produced in a common sintering process, wherein the sintered product is subsequently connected to a fourth area in an appropriate manner such as soldered or glued.

For the length of the sintered material, an upper limit can exist. If the tool has a length which exceeds this length which is predetermined by the sintering process, then several individually sintered areas would have to be arranged one after the other and connected to one another in an appropriate manner such as soldered or glued.

WO 00/44518 A1 relates to a machining tool for drilling, rubbing, countersinking, milling, sawing and lathing with at least one cutting edge and with at least one chip breaker on the cutting edge, wherein a composite plate made of a chip breaker portion and a cutting edge portion is fastened to the tool and body. Here, the composite plate is designed in the form of a sandwich plate which comprises a chip breaker portion made of hard metal, a central cutting edge portion made of PCD or CBN, and a base made of hard metal, wherein the sandwich plate consisting of a chip breaker portion, a cutting edge portion and a base is soldered by means of the hard base made of hard metal to the tool basic body.

US 2003/0063955 A1 relates to a cutting insert which is formed from a generally flat composite wafer having a predetermined shape and thickness. The wafer contains a central layer made of ultra-hard material, which is integrally connected to an upper support layer and to a lower support layer. The outer edge of the central layer forms at least one cutting edge along at least one side of the wafer. The wafer comprises at least one profiled chip breaker which is formed within the cutting edge by selective removal of a portion of at least one of the support layers from the cutting edge inward.

DE 20 2007 017 088 U1 relates to a cutting tool for the machining of workpieces, in particular workpieces made of nonferrous metals or plastics, whose cutting edge and adjoining chipping surface consist of an ultra-hard layer made of monocrystalline or polycrystalline diamond (PCD) or polycrystalline boron nitride, which is connected to a support layer made of hard metal, wherein, behind the cutting edge, the chipping surface forms a beveled or concavely rounded slope of a recess in the ultra-hard layer. Immediately behind the depression, the ultra-hard layer has been removed to the support layer, wherein in the recess a guide body is fastened to the support layer, which rises above the ultra-hard layer and which is provided with a beveled or concavely rounded chip guiding surface which adjoins the portion of the chipping surface which rises from the depression.

EP 1 023 961 A1 relates to a cutting tool for the machining of workpieces, in particular workpieces made of nonferrous metals or plastic. The cutting edge and the chipping surface consist of a layer made of PCD or PCB. It is proposed to machine a depression which is delimited on all sides into the chipping surface at a distance of 0.2 to 0.4 mm from the cutting edge by profile die sinking.

DE 690 07 897 T2 relates to a cutting element for a rotary drill bit with a multi-layer cutting surface. The cutting element comprises a cutting plate made of PCD, which has a front cutting surface and a rear surface, wherein the rear surface of the cutting plate is connected to a substrate made of a material which is less hard than the PCD. Furthermore, the cutting plate has a front portion which forms the cutting surface and which consists of a PCD material type which is less resistant to abrasion than the PCD material which forms at least one other portion of the remaining portion of the cutting plate.

In another method for producing a cutting tool known from the prior art, a cutting element comprising a cutting edge, which is formed from an ultra-hard layer made of polycrystalline diamond (PCD) or polycrystalline boron nitride (PCBn), which is connected firmly such as sintered to a support layer made of hard material and which is soldered with its support layer made of hard metal onto a basic body consisting, for example, of hard metal or steel. Subsequently, the cutting edge with chipping surface is formed in the ultra-hard layer, for example, by grinding, by a laser process or by a die sinking process.

The cutting element has been cut in a fitting manner, for example, from a round, disk-shaped, commercially available blank (round blank) with the ultra-hard PCD or PCBn layer and the support layer made of hard metal.

Based on this, the underlying aim of the present invention is to provide an alternative method for producing cutting tools, and a cutting tool of the type mentioned at the start, which has a broad range of application and is easy to produce.

The aim is achieved according to the invention in that the hard metal support layer protrudes over the front surface and/or face of the basic body and in that, from the hard metal support layer, at least in sections, an active portion which protrudes over the face and/or front surface is formed in the form of at least a section of the cutting edge of a drill bit or cutting bit, and/or a chip guiding portion is formed in the form of at least a section of a chip guiding surface or chip guiding step.

The ultra-hard layer of the cutting element, which forms at least a section of the cutting edge, is connected directly to the basic body, and the hard metal support layer extends over the face and/or front surface of the basic body and is available for further processing.

From the protruding hard metal support layer, at least in sections, an active portion protruding or projecting over the face and/or front surface and/or a chip guiding portion of the cutting element is formed, preferably by means of a grinding process, a laser process, or a die sinking process. The result is a plurality of design possibilities, since the active portion can be formed in the form of at least a section of the cutting edge of the drill bit or cutting bit, and/or the machine guiding portion can be formed in the form of a chip guiding surface or chip guiding step. Compared to the prior art, a completely new path is taken by the method according to the invention. The reversed arrangement of the cutting element, in comparison to the prior art, results in previously unimaginable possibilities both in the production and in the design of the cutting tool. In particular, the hard metal support layer protruding over the upper side and/or front side of the basic body is available as an active portion and/or as a chip guiding portion.

The ultra-hard layer of the cutting element is soldered by a soldering process, preferably a vacuum soldering process, to the basic body which preferably comprises a material which can be soldered in a vacuum, such as hard metal, sinter metal, ceramic or steel. Subsequently, the cutting edge is formed with adjoining chipping surface in a surface of the ultra-hard layer, which adjoins the hard metal support layer.

Preferably, the cutting edge with adjoining chipping surface is formed by ablation of the hard metal support layer, preferably by means of a grinding, laser or die sinking process.

The cutting element can be cut in a fitting manner from a preferably round, disk-shaped blank such as a PCD round blank or PCBn round blank.

Furthermore, the invention relates to a cutting tool for the machining of workpieces, in particular workpieces made of nonferrous metals, plastics, composite materials, hardened steels or cast materials, comprising a cutting element with a cutting edge, which is firmly connected, such as soldered, to a basic body, wherein the cutting element is formed from an ultra-hard layer made of polycrystalline diamond (PCD) or polycrystalline boron nitride (PCBn), which is connected, such as soldered, to a hard metal layer, wherein the ultra-hard layer of the cutting element, which forms the cutting edge at least in sections, is connected directly to the basic body.

According to the invention, it is provided that the hard metal layer protrudes over the front surface and/or face of the basic body and forms, at least in sections, an active portion protruding over the front surface and/or face, in the form of at least a section of a drill bit or of a cutting bit, and/or a chip guiding portion in the form of at least a section of a chip guiding surface or chip guiding step.

In a preferred embodiment, it is provided that the ultra-hard layer is soldered, in particular vacuum soldered, to the basic body.

Preferably, the cutting edge is formed with an adjoining chipping surface in a surface of the ultra-hard layer, which adjoins the hard metal support layer.

Alternatively, the sections of the cutting edge of the drill bit or cutting bit with adjoining chipping surface can be formed in the hard metal layer and the ultra-hard layer, wherein the sections of the cutting edge of the drill bit or cutting bit transition continuously into one another.

The cutting edge and an adjoining chipping surface are produced by ablation of the hard metal support layer in some areas, preferably by a grinding, laser or die sinking process in the hard metal layer and/or in a surface of the ultra-hard layer, which adjoins the hard metal support layer.

Preferably, the active portion and/or the chip guiding portion of the cutting element can be produced by a grinding, laser or die sinking process from the hard metal support layer.

The chip guiding portion can also be formed as a chip breaker with a chip guiding surface adjoining the chipping surface of the cutting edge.

Purely as an example and in a manner which does not limit the invention, in the case of a cutting element with chip breaker function, it is provided that the hard metal layer has a thickness $D_{HS}$ preferably in the range of $0.3$ mm$\leq D_{HS} \leq 2.5$ mm, particularly preferably in the range of $0.4$ mm$\leq D_{HS} \leq 0.8$ mm, in particular a thickness $D_{HS}=0.5$ mm, and that the ultra-hard layer has a thickness $D_{US}$ preferably in the range of $0.3$ mm$\leq D_{US} \leq 1.5$ mm, particularly preferably in the range of $0.5$ mm$\leq D_{US} \leq 1.0$ mm, in particular a thickness $D_{US}=0.7$ mm. According to the invention, it can be provided that preferably, although in a manner which does not limit the scope of protection, a thickness ratio exists between the hard metal layer and the ultra-hard layer in the range of $0.2 \leq D_{HS}/D_{US} \leq 5.0$, preferably in the range $0.3 \leq D_{HS}/D_{US} \leq 1.5$.

The cutting tool can be designed as a drilling tool, for example, a spiral drill, a dowel hole drill, a sickle drill or a step drill, wherein the cutting element in the form of a cylindrical body is connected, such as soldered, with its ultra-hard layer to a front surface of a cylindrical basic body, for example, of a steel, ceramic or hard metal shaft, wherein the active portion of the hard metal support layer is designed at least in sections as the drill bit of the drill.

The invention also relates to a drilling tool, in particular a dowel hole drill, for the machining of workpieces, in particular workpieces made of wood, plastics, composite materials, comprising a drill shaft with a front surface, as well as a drill head with at least one cutting edge, which is firmly connected, such as soldered, to the drill shaft. According to the invention, it is proposed that the drill head is formed from a composite material with exclusively two layers, namely a hard metal layer and an ultra-hard layer which is connected to the hard metal layer and preferably formed from polycrystalline diamond or polycrystalline boron nitride, that the ultra-hard layer is connected directly to the front surface of the drill shaft, and that the at least one cutting edge is formed by the ultra-hard layer, and a drill bit such as a centering tip is formed by the hard metal layer.

Purely as an example and in a manner which does not limit the invention, in the case of a cutting element for a drilling tool, it is provided that the hard metal support layer has a thickness $D_{HB}$ in the range of $0.3$ mm$\leq D_{HB} \leq 10$ mm, preferably in the range of $0.4$ mm$\leq D_{HB} \leq 6.5$ mm, in particular $D_{HB}=0.75$ mm, and that the ultra-hard layer has a thickness $D_{UB}$ in the range of $0.7$ mm$\leq D_{UB} \leq 3.5$ mm, preferably in the range of $1.0$ mm$\leq D_{UB} \leq 1.8$ mm, in particular $D_{USB}=1.5$ mm.

According to the invention it can be provided that preferably, but not in a manner which limits the scope of protection, a thickness ratio $D_{UB}/D_{HB}$ exists between hard metal layer and ultra-hard metal layer in the range of $0.2 \leq D_{HB}/D_{UB} \leq 5.0$, preferably of $0.3 \leq D_{HB}/D_{UB} \leq 2.0$.

Alternatively, the cutting tool can also be designed as a milling tool such as, for example, an end mill, wherein preferably the cutting bit or at least a portion of said cutting bit is designed as the active portion made of the hard metal support layer and/or of the ultra-hard layer and/or of the chip guiding portion made of the hard metal support layer and/or of the ultra-hard layer. The cutting tool can also be designed as a lathing tool.

Purely as an example and in a manner which does not limit the invention, the drilling or milling tools can have a diameter in the range of 2 mm to 12 mm, preferably 3 mm to 10 mm. The ultra-hard layer can be connected by a positive-locking connection to the basic body, wherein a recess such as a slot is made in the front surface or face, in which a protrusion starting from the ultra-hard layer, such as a flange, protrudes.

Finally, the cutting tool can also be designed as an insert for a holder or as an indexable insert with several cutting edges.

Additional details, advantages and features of the invention result not only from the claims, from the features that can be taken from the claims—separately and/or in combination—, but also from the following description of preferred embodiment examples to be taken from the drawings.

In the drawing:

FIG. 1 shows a side view of a basic body with a cutting element blank for producing a cutting tool, FIG. 2 shows a section of the basic body according to FIG. 1 with soldered cutting element blank, FIG. 3 shows a side view of a first embodiment of a cutting tool, FIG. 4 shows a detail C from FIG. 3 at an enlarged scale, FIG. 5 shows a side view of a second embodiment of a cutting tool, FIG. 6 shows a perspective representation of a cutting element blank consisting of two layers, FIG. 7 shows a perspective representation of a drilling tool according to the invention, FIG. 8 shows a side view of the drilling tool, FIG. 9 shows a side view of the drilling tool in a position rotated by 90° with respect to FIG. 8, FIG. 10 shows a detail A of the drilling tool according to FIG. 8, FIG. 11 shows a detail B of the drilling tool according to FIG. 9, and FIG. 12 shows a top view of the drilling tool.

FIGS. 1 and 2 show in general a side view of a basic body 10 with a cutting element blank 12 for producing a cutting tool. The production of the cutting tool occurs in such a manner that first the cutting element blank 12 is cut out in a fitting manner from a round, disk-shaped commercially available blank such as a PCD round blank or a PCBn round blank consisting of an ultra-hard layer 16 made of polycrystalline diamond (PCD) or polycrystalline boron nitride (PCBn), which is firmly connected, such as sintered, to a hard metal support layer 14. According to the invention, the cutting element blank is soldered with its ultra-hard layer 16 in a recess 18 of the basic body 10. The soldering process occurs preferably in a vacuum.

Figure 1:
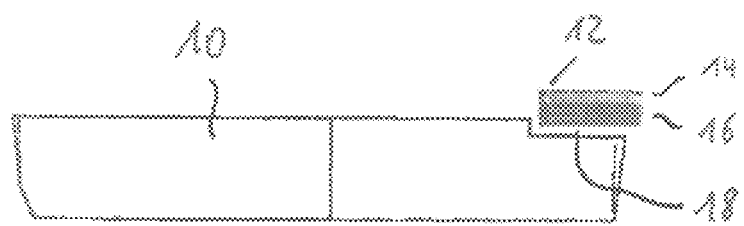
Figure 2:
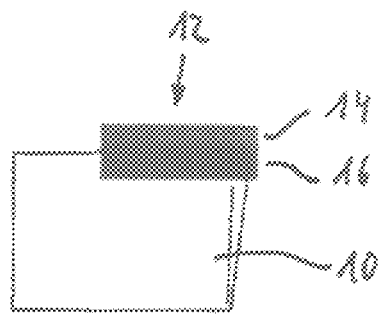
FIG. 2 shows a section of the basic body 10 with a soldered-in cutting element blank 12.
Figure 3:
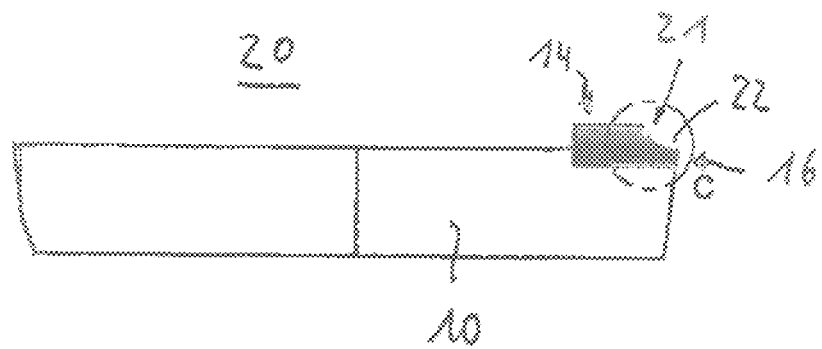
FIGS. 3 and 4 show purely as an example a cutting tool 20 in the form of a cutting plate with chip breaker function.
Figure 4:
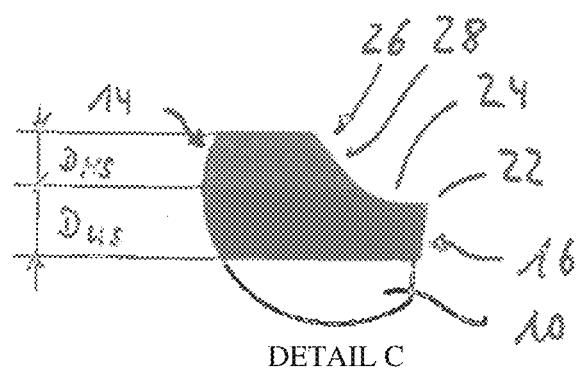

After the soldering, the cutting element blank 12 is formed to a cutting element 21, preferably by means of a grinding, laser or die sinking process. The hard metal support layer 14 is ablated at least in some areas in order to form, in a surface adjoining the hard metal support layer 14, a cutting edge 22 as well as a chipping surface 24 adjoining the cutting edge 22.

In the embodiment example represented, the hard metal support layer 14 is formed at least in some areas as a chip guiding portion 26 such as a chip breaker with a chip guiding surface 28 adjoining the chipping surface 24, preferably by a grinding, laser or die sinking process.

According to the invention, it can be provided that preferably, but not in a manner which limits the scope of protection, a thickness ratio exists between the hard metal support layer 14 and the ultra-hard layer 16 in the range of $0.2 \leq D_{HS}/D_{US} \leq 5.0$, preferably in the range of $0.3 \leq D_{HS} \leq D_{US} \leq 1.5$.

In accordance with the method according to the invention, it is also possible to produce cutting tools in the form of drilling tools, for example, spiral drills, dowel hole drills, sickle drills or step drills or milling tools such as end mills, for example.

Figures 5, 6:
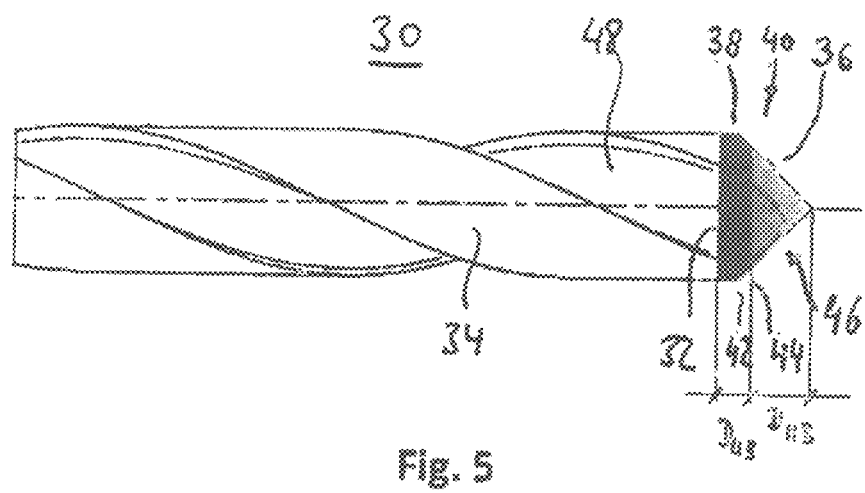

FIG. 5 shows an embodiment of a drilling tool 30 in a side view. In this embodiment, a cylindrical cutting element blank 35 is soldered, for example, on a front surface 32 of a cylindrical, preferably spiral-shaped basic body 34.

The cutting element blank 35 is represented in FIG. 6 and comprises exclusively two layers, namely a hard metal support layer 36 and an ultra-hard layer 38, such as a PCD layer or PCBn layer, which is firmly connected, such as sintered, to said hard metal support layer.

According to the invention, the cutting element blank 35 is soldered, preferably vacuum soldered, directly with its ultra-hard layer 38 to the front surface 32 of the basic body 34. In this way, a cutting element 40 can be formed from the cutting element blank, preferably by means of a grinding, laser or die sinking process. By the ablation of material in some areas, a cylinder shell-shaped section is formed from the ultra-hard layer 38, which transitions in a first section of a cutting edge 42 with chipping surface 44 of a drill bit 46. From the hard metal support layer 36, an active portion in the form of the drill bit 46 with a second section of the cutting edge 42 is formed. The sections of the cutting edge 42 transition continuously into one another. The cutting edges 42 and chipping surfaces 44 formed in the ultra-hard layer 38 and the hard metal layer 36 transition into or adjoin chipping grooves 48 which are formed in the steel, ceramic or hard metal basic body.

FIG. 7 shows, in a perspective view, a drilling tool 50 in the form of a dowel hole drill for producing dowel holes in materials constructed preferably in layers, such as coated wood materials. The drilling tool 50 comprises a basic body 52 with a clamping shaft 54 and a drill shaft 56, on the free end of which, a drill head 58 is arranged. The drill head 58 is produced from the cutting element blank 35, as represented in FIG. 6. The blank 35 consists exclusively of two layers, namely the hard metal support layer 36 and the ultra-hard layer 38 such as a PCB layer or a PCBn layer, which are connected, such as sintered, to the hard metal layer 36.

FIGS. 8 and 9 show side views of the drilling tool 50 in different turning positions.

According to the invention, for the formation of the drill head 58, the cutting element blank 35 is connected, such as soldered, with the ultra-hard layer 38 to a front surface 60 of the drill shaft 56. Subsequently, a drill bit 62, such as a centering tip, and cutting edges 64, 66 are formed in the cutting element blank 35 by grinding, laser and/or electric die sinking processes.

FIGS. 10 and 11 show the drill head 58 in each case as a detail in different turning positions. The drill head 58 comprises a conical drill bit 62 such as a centering tip, which is formed along a central axis of the drilling tool by material ablation from the hard metal layer 36 of the cutting element blank. In the ultra-hard layer 38, cutting edges 64, 66 are also formed by material ablation, which are represented in a front view in FIG. 10, in a side view in FIG. 11, and in a top view in FIG. 12.

The cutting edges 64, 66 transition continuously into the conical drill bit 62. In each case free surfaces 68, 70 which are also formed by material ablation in the ultra-hard layer 38 adjoin the cutting edges 64, 66. The free surfaces transition seamlessly, on the one hand, into the surface of the conical drill bit 62 and, on the other hand, into chipping grooves 72, 74 which are formed in the shape of spirals in the drill shaft 56.

Moreover, in the ultra-hard layer 38, adjoining the cutting edges 64, 66, chipping surfaces 76, 78 are formed in each case, which transition seamlessly into the chipping grooves 72, 74 of the drill shaft 56.

FIG. 10 shows the cutting edges 64, 66 in a front view. The cutting edges extend from the frustoconical drill bit 62 in the shape of an arc radially outward and end in each case in diametrically opposite tips 80, 82.

The invention claimed is:

1. A method for producing a cutting tool for machining a workpiece, the method comprising:
   cutting out a cutting element blank from a blank consisting of an ultra-hard layer of polycrystalline diamond or polycrystalline boron nitride connected to a hard metal support layer;
   soldering the cutting element blank into a recess formed in a surface of a basic body, so that the hard metal support layer protrudes over the surface of the basic body;
   ablating the hard metal support layer to form a cutting edge and a chipping surface in a surface of the ultra-hard layer which adjoins the hard metal support layer; and
   forming a chip guiding portion of the cutting tool from the hard metal support layer that protrudes from the surface of the basic body.

2. The method according to claim 1, comprising soldering the cutting element blank to the basic body using a vacuum soldering process.

3. The method according to claim 1, comprising forming sections of the cutting edge in the ultra-hard layer, or in the hard metal support layer and the ultra-hard layer, wherein the sections of the cutting edge transition continuously into one another.

4. The method according to claim 1, further comprising forming the cutting edge and chipping surface by ablating the hard metal support layer using a grinding, laser, or die sinking process.

5. The method according to claim 1, wherein the active portion or the chip guiding portion is formed using a grinding, laser, or die sinking process.

6. The method according to claim 1, further comprising cutting the cutting element blank from a round, disk-shaped blank.

7. The method according to claim 1, wherein the active portion is a section of a cutting edge of a drill bit or a cutting bit.

8. The method according to claim 1, wherein the active portion is a chip guiding portion section of a chip guiding surface.

* * * * *